W. Q. PFAHLER.
WORM DRIVE.
APPLICATION FILED DEC. 3, 1917.

1,273,533.

Patented July 23, 1918.

Witness
J. R. Tomlin

Inventor
W. Q. Pfahler
By C. A. Snow & Co.
Attorneys

UNITED STATES PATENT OFFICE.

WILLIAM Q. PFAHLER, OF TOLEDO, OHIO.

WORM-DRIVE.

1,273,533.  Specification of Letters Patent.  Patented July 23, 1918.

Application filed December 3, 1917. Serial No. 205,180.

*To all whom it may concern:*

Be it known that I, WILLIAM Q. PFAHLER, a citizen of the United States, residing at Toledo, in the county of Lucas and State of Ohio, have invented a new and useful Worm-Drive, of which the following is a specification.

The device forming the subject matter of this application is a worm wheel, and the invention aims to provide a worm wheel having a novel form of teeth, novel means being provided for mounting the teeth in the worm wheel.

It is within the province of the disclosure to improve generally, and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

Figure 1:
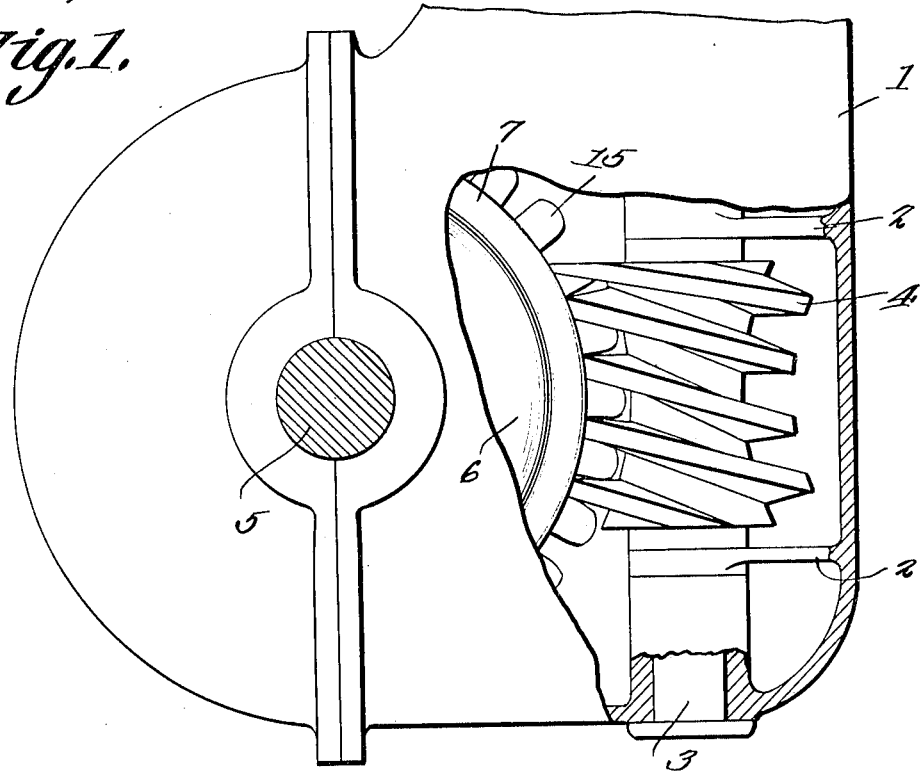
Figure 1 shows in side elevation, a device constructed in accordance with the invention, parts of the casing or support being broken away.

The structure hereinafter described will be found to be peculiarly useful when employed in connection with transmission mechanisms on automobiles, but since the structure is of general utility, and since I do not wish to be limited as to the uses to which the invention may be put, there is shown merely, a casing or support 1 having bearings 2 in which a drive shaft 3 is journaled the shaft carrying a worm 4 which may be of the form shown or otherwise constructed.

A driving shaft 5 is disposed at right angles to the shaft 3 and is journaled in the casing 1. A worm wheel 6 is secured to the shaft 5 and comprises diverging side flanges 7 having peripheral recesses 8 at the bases of which ball races 9 are formed.

Tubular cages 10 are secured in the recesses 8, each cage including an outer flange 11 and an inner flange 12. Teeth 15 in the form of cylindrical pins are mounted to rotate in the cages 10, each tooth 15 having a head 16 received for rotation within the inner flange 12. Balls 17 are interposed between the heads 16 and the bases of the recesses 8 and are received in the ball recess 9, the heads 16 being supplied with similar ball races, if desired. Rollers 18 are retained against endwise movement, within the cages 10, by the flanges 11 and 12, the rollers affording a side bearing for the rotatable teeth 15, and coacting with the heads 16 of the teeth to prevent the teeth from moving outwardly.

Figure 3:
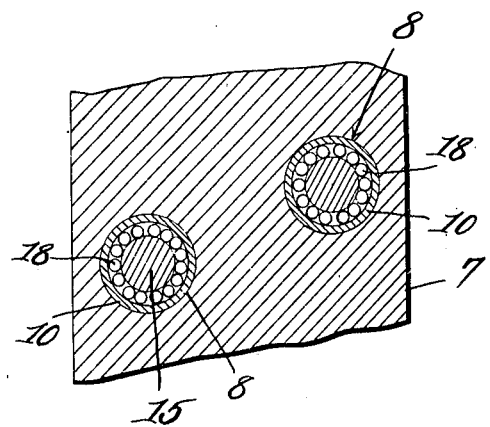
Fig. 3 is a section taken on the line 3—3 of Fig. 2.
Figure 2:
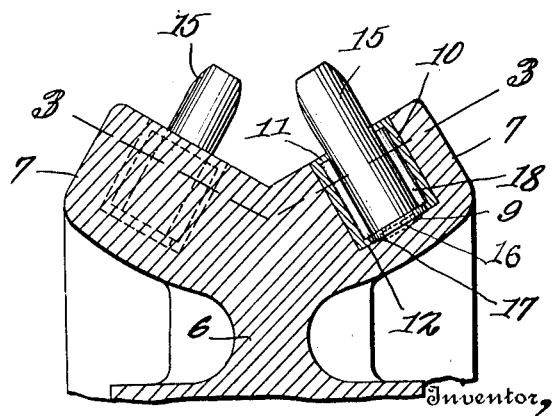
Fig. 2 is a fragmental transverse section showing a portion of the worm wheel.

The worm wheel 6 is provided with circumferential lines of teeth 15, the teeth of one line alternating with the teeth of the other line, as shown in Fig. 3, so that the teeth of the two lines may correspond with the pitch of the worm 4. Further, the teeth 15 in the different lines converge toward each other, as shown in Fig. 2. Owing to the general arrangement of the teeth 15, as above described, since the teeth 15 are rotatable, and because the teeth are anti-frictionally supported both against end thrust and against side thrust, a large proportion of the friction which hitherto has detracted from the successful operation of worm drives, will be done away with.

Having thus described the invention, what is claimed is:

A worm wheel having a peripheral recess and provided with a ball race at the base of the recess; a tubular cage secured in the recess and provided with inner and outer flanges; a cylindrical tooth mounted to rotate in the cage and having a head received for rotation within the inner flange, the head having an end ball race coöperating with the ball race at the base of the recesss; balls in the ball races; and cylindrical rollers disposed between the tooth and the side wall of the cage, the rollers being retained by the flanges.

In testimony that I claim the foregoing as my own, I have hereto affixed my signature in the preesnce of two witnesses.

WILLIAM Q. PFAHLER.

Witnesses:
  FRANK SCHVIN,
  R. W. RICHARDS.